US012695576B2

(12) United States Patent
Brewster et al.

(10) Patent No.: US 12,695,576 B2
(45) Date of Patent: Jul. 28, 2026

(54) MODIFIED RFID TAG INVENTORYING PROCESS

(71) Applicant: Impinj, Inc., Seattle, WA (US)

(72) Inventors: Megan Marie Brewster, Seattle, WA (US); Scott A. Cooper, Seattle, WA (US); Christopher J. Diorio, Shoreline, WA (US); John D. Hyde, Corvallis, OR (US); Rene Dominic Martinez, Seattle, WA (US); Matthew Robshaw, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 340 days.

(21) Appl. No.: 18/272,741

(22) PCT Filed: Jan. 20, 2022

(86) PCT No.: PCT/US2022/013164
§ 371 (c)(1),
(2) Date: Jul. 17, 2023

(87) PCT Pub. No.: WO2022/159608
PCT Pub. Date: Jul. 28, 2022

(65) Prior Publication Data
US 2024/0305431 A1     Sep. 12, 2024

Related U.S. Application Data

(60) Provisional application No. 63/143,166, filed on Jan. 29, 2021, provisional application No. 63/140,222, filed on Jan. 21, 2021.

(51) Int. Cl.
*H04L 5/00*          (2006.01)
*G06K 7/10*          (2006.01)
(Continued)

(52) U.S. Cl.
CPC ........ *H04L 5/0055* (2013.01); *G06K 7/10099* (2013.01); *G06K 19/0723* (2013.01); *G06Q 10/087* (2013.01)

(58) Field of Classification Search
CPC .............. H04L 5/0055; G06K 7/10099; G06K 19/0723; G06K 7/10019; G06K 17/0022; G06Q 10/087
See application file for complete search history.

(56) References Cited

U.S. PATENT DOCUMENTS 8,779,900 B2 * 7/2014 Park ................... G06K 7/10019
                                                    340/10.2
9,374,134 B2 * 6/2016 Hillan ................ G06K 7/10029
9,767,333 B1 9/2017 Diorio et al.

FOREIGN PATENT DOCUMENTS

CN    2022800101132      7/2023
EP       3444744 A1 *  2/2019    .......... H01Q 21/061
(Continued)

OTHER PUBLICATIONS

EPO European Search Report Application No. 22743184.8 mailed on Nov. 21, 2024.
(Continued)

*Primary Examiner* — Cheikh T Ndiaye
(74) *Attorney, Agent, or Firm* — Turk IP Law, LLC

(57) ABSTRACT

Protocol-specified RFID tag inventorying can be modified to streamline information exchange. For example, RFID tags may be able to respond to certain RFID reader commands with additional or other information instead of only a pseudorandom number or a certain tag identifier, or may not even respond at all. Such other information may include all or portions of other tag identifiers, or information associated with tag identifiers, such as error-checking codes or protocol control bits. Tags may also choose data stored in tag memory with location of the data known only to the tag, compare to a mask received in an inventorying command and decide to participate or not in an inventory round based on a comparison result.

12 Claims, 11 Drawing Sheets

(51) Int. Cl.
  *G06K 19/07* (2006.01)
  *G06Q 10/087* (2023.01)

(56) References Cited

FOREIGN PATENT DOCUMENTS

| | | | | |
|---|---|---|---|---|
| EP | 4281899 | A1 | 11/2023 | |
| WO | WO-2008094728 | A1 * | 8/2008 | ......... G06K 7/10356 |
| WO | 2009131652 | A1 | 10/2009 | |

OTHER PUBLICATIONS

European Search Report No. 22 743 184. mailed Feb. 10, 2025, 8 pages.
International Search Report and Written Opinion for International Application No. PCT/US22/13164 mailed on Jun. 3, 2022, pp. 10.
Epcglobal Inc: "EPC Radio-Frequency 1-15 INV. Identity Protocols Class-1 Generation-2 G06K7/10UHF RFID Protocol for Communications at G06K19/07860 MHz-960 MHz Version 1.2.0", G06Q10/08SPECIFICATION for Rfid Air Interface G06K17/00EPOCGLOBAL INC.,Oct. 23, 2008 (Oct. 23, 2008), pp. 1-108,XP002606215.
EPO, European Search Report for European Patent Application No. 26 166 958.4, Mailed Jun. 18, 2026, pp. 8.

* cited by examiner

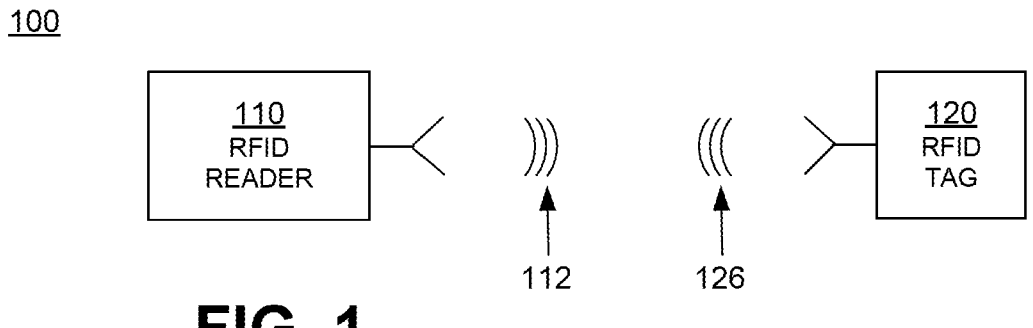
FIG. 1
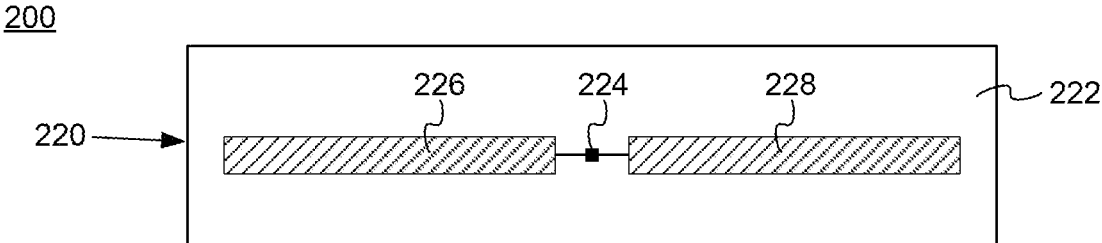
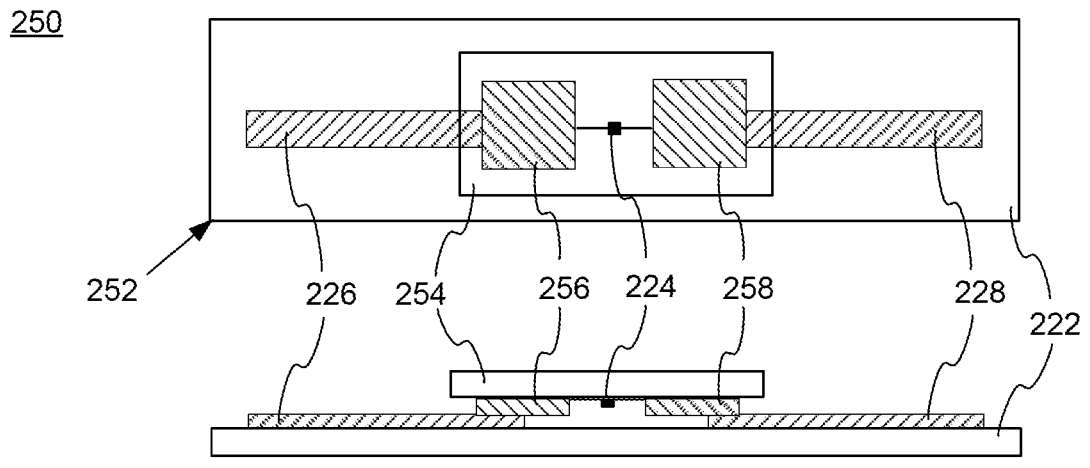
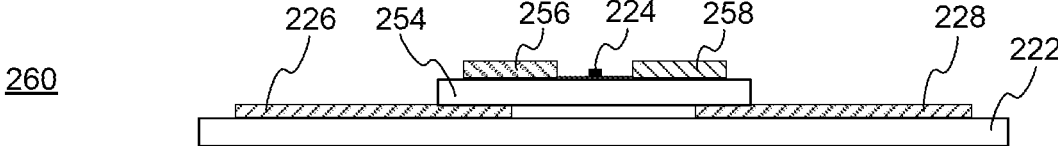
FIG. 2

300

*RFID SYSTEM COMMUNICATION*

RFID TAG IC COMPONENTS

SIGNAL PATH DURING R→T

SIGNAL PATH DURING T→R

810 *Query command*

| | Command | DR | M | TRext | Sel | Session | Target | Q | CRC |
|---|---|---|---|---|---|---|---|---|---|
| # of bits | 4 | 1 | 2 | 1 | 2 | 2 | 1 | 4 | 5 |
| description | 1000 | 0: DR=8<br>1: DR=64/3 | 00: M=1<br>01: M=2<br>10: M=4<br>11: M=8 | 0: No pilot tone<br>1: Use pilot tone | 00: All<br>01: All<br>10: ~SL<br>11: SL | 00: S0<br>01: S1<br>10: S2<br>11: S3 | 0: A<br>1: B | 0~15 | CRC-5 |

FIG. 8A

820 *Select command*

| | Command | Target | Action | MemBank | Pointer | Length | Mask | Truncate | CRC |
|---|---|---|---|---|---|---|---|---|---|
| # of bits | 4 | 3 | 3 | 2 | EBV | 8 | Variable | 1 | 16 |
| description | 1010 | 000: Inventoried (S0)<br>001: Inventoried (S1)<br>010: Inventoried (S2)<br>011: Inventoried (S3)<br>100: SL<br>101: RFU<br>110: RFU<br>111: RFU | See Table 6.30 | 00: FileType<br>01: EPC<br>10: TID<br>11: File_0 | Starting Mask address | Mask length (bits) | Mask value | 0: Disable truncation<br>1: Enable truncation | CRC-16 |

MODIFIED RFID TAG INVENTORYING PROCESS

CROSS REFERENCE TO RELATED APPLICATIONS

This application is a U.S. National Stage filing under 35 U.S.C. § 371 of International Application PCT/US22/13164, filed Jan. 20, 2022, which claims the benefit of U.S. Provisional Patent Application Ser. No. 63/140,222 filed on Jan. 21, 2021, and U.S. Provisional Patent Application Ser. No. 63/143,166 filed on Jan. 29, 2021. The disclosures of the above applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package. The RFID tag typically includes, or is, a radio-frequency (RF) integrated circuit (IC).

In principle, RFID techniques entail using an RFID reader to inventory one or more RFID tags, where inventorying involves singulating a tag, receiving an identifier from a tag, and/or acknowledging a received identifier (e.g., by transmitting an acknowledge command). "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. An "inventory round" is defined as a reader staging RFID tags for successive inventorying. The reader transmitting an RF wave performs the inventory. The RF wave is typically electromagnetic, at least in the far field. The RF wave can also be predominantly electric or magnetic in the near or transitional near field. The RF wave may encode one or more commands that instruct the tags to perform one or more actions. The operation of an RFID reader sending commands to an RFID tag is sometimes known as the reader "interrogating" the tag.

In typical RFID systems, an RFID reader transmits a modulated RF inventory signal (a command), receives a tag reply, and transmits an RF acknowledgment signal responsive to the tag reply. A tag that replies to the interrogating RF wave does so by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section includes an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/ flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Examples are directed to modifying RFID tag inventorying. In some examples, an inventorying command initiating an inventory round may include a collision resolution (CR) value and a response-type value. A tag receiving the inventorying command may generate a CR reply based on the CR value by identifying, based on the CR value, a CR code. The CR code may include a trailing item identifier (II) portion, a stored cyclic-redundancy-check code, or a pseudorandom number. The tag may then send the CR reply including the CR code to the reader. Upon receiving a first acknowledgment command in response to the CR reply, the tag may refrain from replying to the first acknowledgment command if the response-type value indicates that no acknowledgment reply is to be sent. Alternatively, the tag may reply by sending an acknowledgment code indicated by the response-type value. The acknowledgment code may include a tag identifier (TID) portion, another II portion, and the entire II. In other examples, another inventorying command initiating an inventory round may specify a mask value. A tag receiving the other inventorying command may determine a value of a T bit stored in a memory of the tag IC. The T bit may be implemented according to the Gen2 Protocol or the ISO/IEC-18000-63 standard. The tag may determine a starting memory location for data to be compared to the mask value in a first memory bank based on the T bit value, choose the data with the determined starting memory location, and determine whether the mask value matches the chosen data. If the mask value matches the chosen data, the tag may participate in the inventory round, otherwise it may refrain from participating in the inventory round.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIGS. 8A and 8B illustrate command structures of Query and Select commands according to Gen2 Protocol.

DETAILED DESCRIPTION

Figure 3:
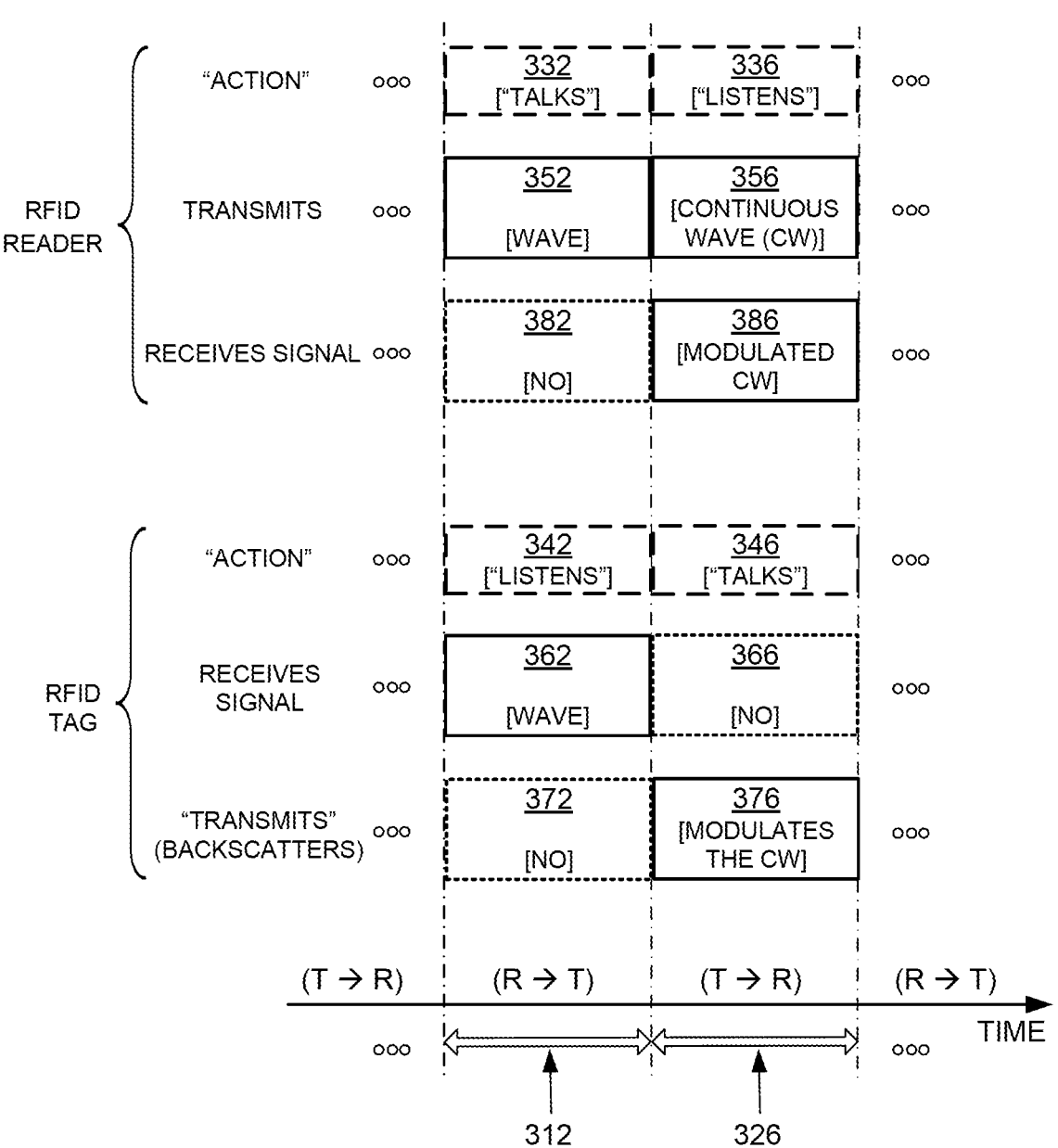
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies. Some portions of memory may be writeable and some not. "Instruction" refers to a request to a tag to perform a single explicit action (e.g., write data into memory). "Command" refers to a reader request for one or more tags to perform one or more actions, and includes one or more tag instructions preceded by a command identifier or command code that identifies the command and/or the tag instructions. "Program" refers to a request to a tag to perform a set or sequence of instructions (e.g., read a value from memory and, if the read value is less than a threshold then lock a memory word). "Protocol" refers to an industry standard for communications between a reader and a tag (and vice versa). One such protocol is the Class-1 Generation-2 UHF RFID Protocol for Communications at 860 MHz-960 MHz by GS1 EPCglobal, Inc. ("the Gen2 Protocol"), versions 1.2.0 and 2.0 of which are hereby incorporated by reference. Another protocol is the ISO/IEC 18000-63 Information technology-Radio frequency identification for item management—Part 63: Parameters for air interface communications at 860 MHz to 960 MHz Type C ("ISO/IEC 18000-63"), also hereby incorporated by reference.

Protocol-specified inventorying can be modified to streamline information exchange. For example, tags may be able to respond to certain reader commands with additional or other information instead of only a pseudorandom number or a certain tag identifier, or may not even respond at all. Such other information may include all or portions of other tag identifiers, item identifiers, information associated with tag identifiers, such as error-checking codes or protocol control bits, or any other information stored on or known to the tag. In other examples, a modified inventorying command may cause the tag itself to choose data stored in its memory for comparison to a mask value in the inventorying command to decide whether to participate in an inventory round or not, where the tag itself determines a location of the data based on one or more memory configuration bits stored in the tag (e.g., the T bit according to the Gen2 Protocol or ISO/IEC 18000-63) and not based on any information in the inventorying command.

Technical advantages of example implementations are numerous. For example, an inventorying command providing a collision resolution value and a response-type value to a tag may increase inventory speed. First, inventory speed is increased by allowing tags to reply with identifier portions for collision resolution instead of pseudorandom numbers, so that the reader does not have to later request those identifier portions and incur additional communication overhead. Second, the reader can avoid having tags re-send identifier portions already known to the reader. Third, the reader can specify that tags only respond with certain identifier portions or data, or even not respond at all.

As another example of technical advantages, an inventorying command with a mask value that receiving tags themselves determine how to compare to memory contents for participation in an inventory round may increase inventorying efficiency. First, including the mask value in the inventorying command initiating an inventory round means only tags that heard the inventorying command and meet the mask value comparison criteria will participate in the inventory round. This prevents tags that may not have heard a preceding selection command (e.g., a Select command according to the Gen2 Protocol) from participating in the inventory round, thereby ensuring that only relevant tags participate. Second, allowing tags themselves to determine how to compare the mask value to tag memory reduces complexity, because the inventorying command does not need to indicate any memory locations and therefore the sending reader does not need to know where and how tags store data. This may be especially relevant when tags with different numbering schemes and formats are present in the same population.

Of course, tags may be configured to operate using both standard protocols (e.g., the Gen2 Protocol and/or ISO/IEC 18000-63) and the enhanced inventorying commands.

FIG. 1 is a diagram of the components of a typical RFID system 100, incorporating embodiments. An RFID reader 110 and a nearby RFID tag 120 communicate via RF signals 112 and 126. When sending data to tag 120, reader 110 may generate RF signal 112 by encoding the data, modulating an RF waveform with the encoded data, and transmitting the modulated RF waveform as RF signal 112. In turn, tag 120 may receive RF signal 112, demodulate encoded data from RF signal 112, and decode the encoded data. Similarly, when sending data to reader 110 tag 120 may generate RF signal 126 by encoding the data, modulating an RF waveform with the encoded data, and causing the modulated RF waveform to be sent as RF signal 126. The data sent between reader 110 and tag 120 may be represented by symbols, also known as RFID symbols. A symbol may be a delimiter, a calibration value, or implemented to represent binary data, such as "0" and "1", if desired. Upon processing by reader 110 and tag 120, symbols may be treated as values, numbers, or any other suitable data representations.

The RF waveforms transmitted by reader 110 and/or tag 120 may be in a suitable range of frequencies, such as those near 900 MHz, 13.56 MHz, or similar. In some embodiments, RF signals 112 and/or 126 may include non-propagating RF signals, such as reactive near-field signals or similar. RFID tag 120 may be active or battery-assisted (i.e., possessing its own power source), or passive. In the latter case, RFID tag 120 may harvest power from RF signal 112.

FIG. 2 is a diagram of an RFID tag 220, which may function as tag 120 of FIG. 1. Tag 220 may be formed on a substantially planar inlay 222, which can be made in any suitable way. Tag 220 includes a circuit which may be implemented as an IC 224. In some embodiments IC 224 is fabricated in complementary metal-oxide semiconductor (CMOS) technology. In other embodiments IC 224 may be fabricated in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for transmitting and/or interacting with RF signals. In some embodiments the antenna can be etched, deposited, and/or printed metal on inlay 222; conductive thread formed with or without substrate 222; nonmetallic conductive (such as graphene) patterning on substrate 222; a first antenna coupled inductively, capacitively, or galvanically to a second antenna; or can be fabricated in myriad other ways that exist for forming antennas to receive RF waves. In some embodiments the antenna may even be formed in IC 224. Regardless of the antenna type, IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments. Antenna segments 226 and 228 are depicted as separate from IC 224, but in other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna couples with RF signals in the environment and propagates the signals to IC 224, which may both harvest power and respond if appropriate, based on the incoming signals and the IC's internal state. If IC 224 uses backscatter modulation then it may generate a response signal (e.g., signal 126) from an RF signal in the environment (e.g., signal 112) by modulating the antenna's reflectance. Electrically coupling and uncoupling the IC contacts of IC 224 can modulate the antenna's reflectance, as can varying the admittance or impedance of a shunt-connected or series-connected circuit element which is coupled to the IC contacts. If IC 224 is capable of transmitting signals (e.g., has its own power source, is coupled to an external power source, and/or can harvest sufficient power to transmit signals), then IC 224 may respond by transmitting response signal 126. In the embodiments of FIG. 2, antenna segments 226 and 228 are separate from IC 224. In other embodiments, the antenna segments may alternatively be formed on IC 224.

An RFID tag such as tag 220 is often attached to or associated with an individual item or the item packaging. An RFID tag may be fabricated and then attached to the item or packaging, may be partly fabricated before attachment to the item or packaging and then completely fabricated upon attachment to the item or packaging, or the manufacturing process of the item or packaging may include the fabrication of the RFID tag. In some embodiments, the RFID tag may be integrated into the item or packaging. In this case, portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. Thus, an "RFID IC" need not be distinct from an item, but more generally refers to the item containing an RFID IC and antenna capable of interacting with RF waves and receiving and responding to RFID signals. Because the boundaries between IC, tag, and item are thus often blurred, the terms "RFID IC", "RFID tag", "tag", or "tag IC" as used herein may refer to the IC, the tag, or even to the item as long as the referenced element is capable of RFID functionality.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication. Another such mode, which may be more suitable for passive tags, is called half-duplex, and is described below.

FIG. 3 is a conceptual diagram 300 for explaining half-duplex communications between the components of the RFID system of FIG. 1, in this case with tag 120 implemented as a passive tag. The explanation is made with reference to a TIME axis, and also to a human metaphor of "talking" and "listening". The actual technical implementations for "talking" and "listening" are now described.

In a half-duplex communication mode, RFID reader 110 and RFID tag 120 talk and listen to each other by taking turns. As seen on axis TIME, reader 110 talks to tag 120 during intervals designated "R→T", and tag 120 talks to reader 110 during intervals designated "T→R". For example, a sample R→T interval occurs during time interval 312, during which reader 110 talks (block 332) and tag 120 listens (block 342). A following sample T→R interval occurs during time interval 326, during which reader 110 listens (block 336) and tag 120 talks (block 346). Interval 312 may be of a different duration than interval 326—here the durations are shown approximately equal only for purposes of illustration.

During interval 312, reader 110 transmits a signal such as signal 112 described in FIG. 1 (block 352), while tag 120 receives the reader signal (block 362), processes the reader signal to extract data, and harvests power from the reader signal. While receiving the reader signal, tag 120 does not backscatter (block 372), and therefore reader 110 does not receive a signal from tag 120 (block 382).

During interval 326, also known as a backscatter time interval or backscatter interval, reader 110 does not transmit a data-bearing signal. Instead, reader 110 transmits a continuous wave (CW) signal, which is a carrier that generally does not encode information. The CW signal provides energy for tag 120 to harvest as well as a waveform that tag 120 can modulate to form a backscatter response signal. Accordingly, during interval 326 tag 120 is not receiving a signal with encoded information (block 366) and instead modulates the CW signal (block 376) to generate a backscatter signal such as signal 126 described in FIG. 2. Tag 120 may modulate the CW signal to generate a backscatter signal by adjusting its antenna reflectance, as described above. Reader 110 then receives and processes the backscatter signal (block 386).

Figure 4:
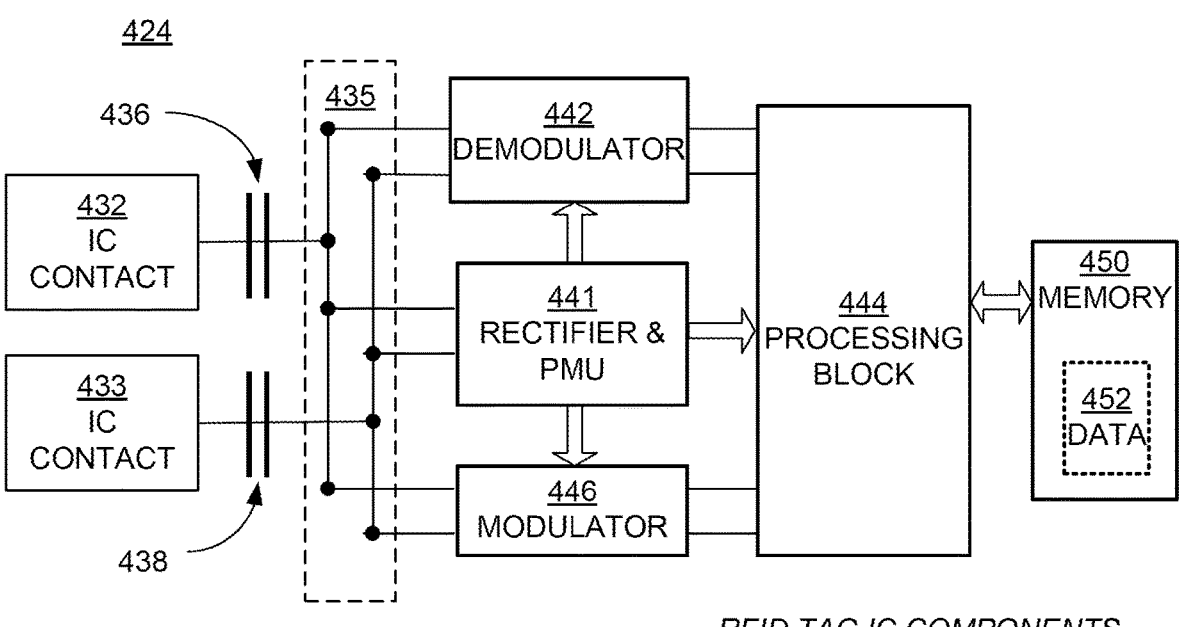
FIG. 4 is a block diagram showing a detail of an RFID tag, such as the one shown in FIG. 2.

FIG. 4 is a block diagram showing a detail of an RFID IC, such as IC 224 in FIG. 2. Electrical circuit 424 may be implemented in an IC, such as IC 224. Circuit 424 implements at least two IC contacts 432 and 433, suitable for coupling to antenna segments such as antenna segments 226/228 in FIG. 2. When two IC contacts form the signal input from and signal return to an antenna they are often referred-to as an antenna port. IC contacts 432 and 433 may be made in any suitable way, such as from electrically-conductive pads, bumps, or similar. In some embodiments circuit 424 implements more than two IC contacts, especially when configured with multiple antenna ports and/or to couple to multiple antennas.

Circuit 424 includes signal-routing section 435 which may include signal wiring, signal-routing busses, receive/transmit switches, and similar that can route signals between the components of circuit 424. IC contacts 432/433 may couple galvanically, capacitively, and/or inductively to signal-routing section 435. For example, optional capacitors 436 and/or 438 may capacitively couple IC contacts 432/433 to signal-routing section 435, thereby galvanically decoupling IC contacts 432/433 from signal-routing section 435 and other components of circuit 424.

Capacitive coupling (and the resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In these embodiments, galvanically decoupling IC contact 432 from IC contact 433 may prevent the formation of a DC short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 includes a rectifier and PMU (Power Management Unit) 441 that harvests energy from the RF signal incident on antenna segments 226/228 to power the circuits of IC 424 during either or both reader-to-tag (R→T) and tag-to-reader (T→R) intervals. Rectifier and PMU 441 may be implemented in any way known in the art, and may include one or more components configured to convert an alternating-current (AC) or time-varying signal into a direct-current (DC) or substantially time-invariant signal.

Circuit 424 also includes a demodulator 442, a processing block 444, a memory 450, and a modulator 446. Demodulator 442 demodulates the RF signal received via IC contacts 432/433, and may be implemented in any suitable way, for example using a slicer, an amplifier, and other similar components. Processing block 444 receives the output from demodulator 442, performs operations such as command decoding, memory interfacing, and other related operations, and may generate an output signal for transmission. Processing block 444 may be implemented in any suitable way, for example by combinations of one or more of a processor, memory, decoder, encoder, and other similar components. Memory 450 stores data 452, and may be at least partly implemented as permanent or semi-permanent memory such as nonvolatile memory (NVM), EEPROM, ROM, or other memory types configured to retain data 452 even when circuit 424 does not have power. Processing block 444 may be configured to read data from and/or write data to memory 450.

Modulator 446 generates a modulated signal from the output signal generated by processing block 444. In one embodiment, modulator 446 generates the modulated signal by driving the load presented by antenna segment(s) coupled to IC contacts 432/433 to form a backscatter signal as described above. In another embodiment, modulator 446 includes and/or uses a transmitter to generate and transmit the modulated signal via antenna segment(s) coupled to IC contacts 432/433. Modulator 446 may be implemented in any suitable way, for example using a switch, driver, amplifier, and other similar components. Demodulator 442 and modulator 446 may be separate components, combined in a single transceiver circuit, and/or part of processing block 444.

In some embodiments, particularly in those with more than one antenna port, circuit 424 may contain multiple demodulators, rectifiers, PMUs, modulators, processing blocks, and/or memories.

Figures 5A, 5B:
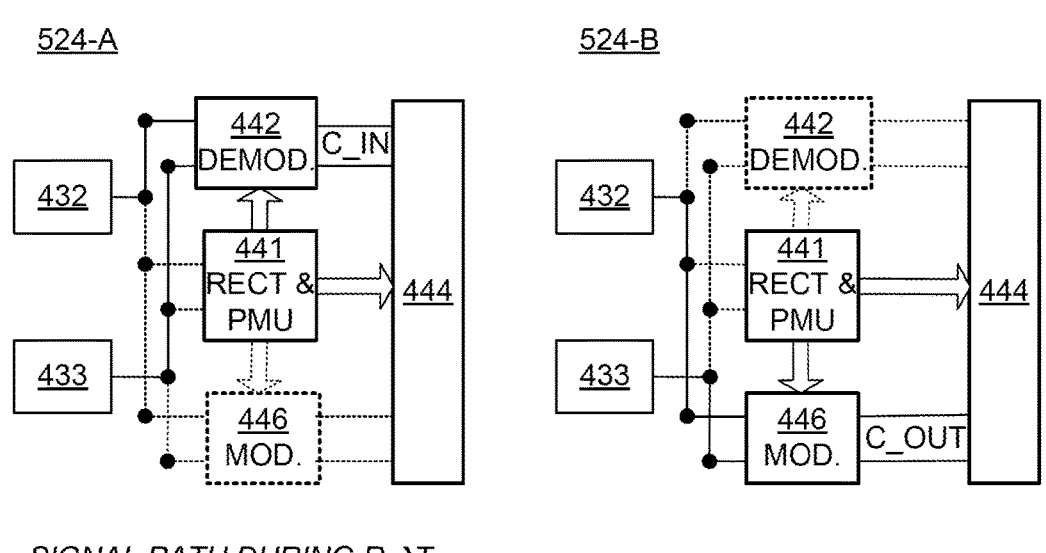
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T interval (e.g., time interval 312 of FIG. 3). During the R→T interval, demodulator 442 demodulates an RF signal received from IC contacts 432/ 433. The demodulated signal is provided to processing block 444 as C_IN, which in some embodiments may include a received stream of symbols. Rectifier and PMU 441 may be active, for example harvesting power from an incident RF waveform and providing power to demodulator 442, processing block 444, and other circuit components. During the R→T interval, modulator 446 is not actively modulating a signal, and in fact may be decoupled from the RF signal. For example, signal routing section 435 may be configured to decouple modulator 446 from the RF signal, or an impedance of modulator 446 may be adjusted to decouple it from the RF signal.

FIG. 5B shows version 524-B of components of circuit 424 of FIG. 4, further modified to emphasize a signal operation during a T→R interval (e.g., time interval 326 of FIG. 3). During the T→R interval, processing block 444 outputs a signal C_OUT, which may include a stream of symbols for transmission. Modulator 446 then generates a modulated signal from C_OUT and sends the modulated signal via antenna segment(s) coupled to IC contacts 432/ 433, as described above. During the T→R interval, rectifier and PMU 441 may be active, while demodulator 442 may not be actively demodulating a signal. In some embodiments, demodulator 442 may be decoupled from the RF signal during the T→R interval. For example, signal routing section 435 may be configured to decouple demodulator 442 from the RF signal, or an impedance of demodulator 442 may be adjusted to decouple it from the RF signal.

In typical embodiments, demodulator 442 and modulator 446 are operable to demodulate and modulate signals according to a protocol, such as the Gen2 Protocol mentioned above. In embodiments where circuit 424 includes multiple demodulators modulators, and/or processing blocks, each may be configured to support different protocols or different sets of protocols. A protocol specifies, in part, symbol encodings, and may include a set of modulations, rates, timings, or any other parameter associated with data communications. A protocol can be a variant of an internationally ratified protocol such as the Gen2 Protocol, for example including fewer or additional commands than the ratified protocol calls for, and so on. In some instances, additional commands may sometimes be called custom commands.

Figure 6:
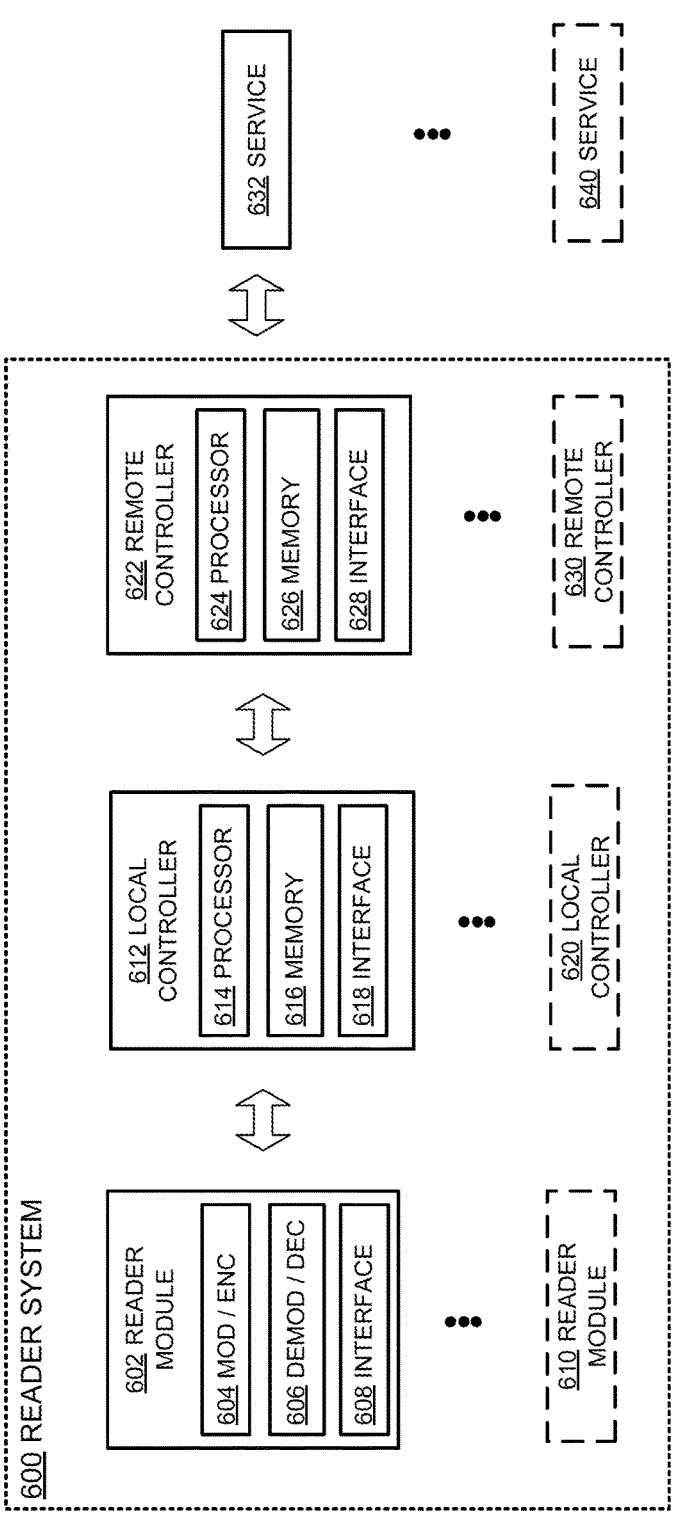
FIG. 6 is a block diagram showing a detail of an RFID reader system, such as the one shown in FIG. 1.

FIG. 6 depicts an RFID reader system 600 according to embodiments. Reader system 600 is configured to communicate with RFID tags and optionally to communicate with entities external to reader system 600, such as a service 632. Reader system 600 includes at least one reader module 602, configured to transmit signals to and receive signals from RFID tags. Reader system 600 further includes at least one local controller 612, and in some embodiments includes at least one remote controller 622. Controllers 612 and/or 622 are configured to control the operation of reader module 602, process data received from RFID tags communicating through reader module 602, communicate with external entities such as service 632, and otherwise control the operation of reader system 600.

In some embodiments, reader system 600 may include multiple reader modules, local controllers, and/or remote controllers. For example, reader system 600 may include at least one other reader module 610, at least one other local controller 620, and/or at least one other remote controller

630. A single reader module may communicate with multiple local and/or remote controllers, a single local controller may communicate with multiple reader modules and/or remote controllers, and a single remote controller may communicate with multiple reader modules and/or local controllers. Similarly, reader system 600 may be configured to communicate with multiple external entities, such as other reader systems (not depicted) and multiple services (for example, services 632 and 640).

Reader module 602 includes a modulator/encoder block 604, a demodulator/decoder block 606, and an interface block 608. Modulator/encoder block 604 may encode and modulate data for transmission to RFID tags. Demodulator/ decoder block 606 may demodulate and decode signals received from RFID tags to recover data sent from the tags. The modulation, encoding, demodulation, and decoding may be performed according to a protocol or specification, such as the Gen2 Protocol. Reader module 602 may use interface block 608 to communicate with local controller 612 and/or remote controller 622, for example to exchange tag data, receive instructions or commands, or to exchange other relevant information.

Reader module 602 and blocks 604/606 are coupled to one or more antennas and/or antenna drivers (not depicted), for transmitting and receiving RF signals. In some embodiments, reader module 602 is coupled to multiple antennas and/or antenna drivers. In these embodiments, reader module 602 may transmit and/or receive RF signals on the different antennas in any suitable scheme. For example, reader module 602 may switch between different antennas to transmit and receive RF signals, transmit on one antenna but receive on another antenna, or transmit and/or receive on multiple antennas simultaneously. In some embodiments, reader module 602 may be coupled to one or more phased-array or synthesized-beam antennas whose beams can be generated and/or steered, for example by reader module 602, local controller 612, and/or remote controller 622.

Modulator/encoder block 604 and/or demodulator/decoder block 606 may be configured to perform conversion between analog and digital signals. For example, modulator/ encoder block 604 may convert a digital signal received via interface block 608 to an analog signal for subsequent transmission, and demodulator/decoder block 606 may convert a received analog signal to a digital signal for transmission via interface block 608.

Local controller 612 includes a processor block 614, a memory 616, and an interface 618. Remote controller 622 includes a processor block 624, a memory 626, and an interface 628. Local controller 612 differs from remote controller 622 in that local controller 612 is collocated or at least physically near reader module 602, whereas remote controller 622 is not physically near reader module 602.

Processor blocks 614 and/or 624 may be configured to, alone or in combination, provide different functions. Such functions may include the control of other components, such as memory, interface blocks, reader modules, and similar; communication with other components such as reader module 620, other reader systems, services 632/640, and similar; data-processing or algorithmic processing such as encryption, decryption, authentication, and similar; or any other suitable function. In some embodiments, processor blocks 614/624 may be configured to convert analog signals to digital signals or vice-versa, as described above in relation to blocks 604/606; processor blocks 614/624 may also be configured to perform any suitable analog signal processing or digital signal processing, such as filtering, carrier cancellation, noise determination, and similar.

Processor blocks 614/624 may be configured to provide functions by execution of instructions or applications, which may be retrieved from memory (for example, memory 616 and/or 626) or received from some other entity. Processor blocks 614/624 may be implemented in any suitable way. For example, processor blocks 614/624 may be implemented using digital and/or analog processors such as microprocessors and digital-signal processors (DSPs); controllers such as microcontrollers; software running in a machine such as a general purpose computer; programmable circuits such as field programmable gate arrays (FPGAs), field-programmable analog arrays (FPAAs), programmable logic devices (PLDs), application specific integrated circuits (ASIC), any combination of one or more of these; and equivalents.

Memories 616/626 are configured to store information, and may be implemented in any suitable way, such as the memory types described above, any combination thereof, or any other known memory or information storage technology. Memories 616/626 may be implemented as part of their associated processor blocks (e.g., processor blocks 614/624) or separately. Memories 616/626 may store instructions, programs, or applications for processor blocks 614/624 to execute. Memories 616/626 may also store other data, such as files, media, component configurations or settings, etc.

In some embodiments, memories 616/626 store tag data. Tag data may be data read from tags, data to be written to tags, and/or data associated with tags or tagged items. Tag data may include identifiers for items or tags such as electronic product codes (EPCs), unique item identifiers (UIIs), tag identifiers (TIDs), or any other information suitable for identifying individual items or tags. Tag data may also include tag passwords, tag profiles, tag cryptographic keys (secret or public), tag key generation algorithms, and any other suitable information about tags or items associated with tags.

Memories 616/626 may also store information about how reader system 600 is to operate. For example, memories 616/626 may store information about algorithms for encoding commands for tags, algorithms for decoding signals from tags, communication and antenna operating modes, encryption/authentication algorithms, tag location and tracking algorithms, cryptographic keys and key pairs (such as public/private key pairs) associated with reader system 600 and/or other entities, electronic signatures, and similar.

Interface blocks 608, 618, and 628 are configured to communicate with each other and with other suitably configured interfaces. The communications between interface blocks occur via the exchange of signals containing data, instructions, commands, or any other suitable information. For example, interface block 608 may receive data to be written to tags, information about the operation of reader module 602 and its constituent components, and similar; and may send data read from tags. Interface blocks 618 and 628 may send and receive tag data, information about the operation of other components, other information for enabling local controller 612 and remote controller 622 to operate in conjunction, and similar. Interface blocks 608/618/628 may also communicate with external entities, such as services 632, 640, other services, and/or other reader systems.

Interface blocks 608/618/628 may communicate using any suitable wired or wireless means. For example, interface blocks 608/618/628 may communicate over circuit traces or interconnects, or other physical wires or cables, and/or using any suitable wireless signal propagation technique. In some embodiments, interface blocks 608/618/628 may communicate via an electronic communications network, such as a local area network (LAN), a metropolitan area network (MAN), a wide area network (WAN), a network of networks such as the internet. Communications from interface blocks 608/618/628 may be secured, for example via encryption and other electronic means, or may be unsecured.

Reader system 600 may be implemented in any suitable way. One or more of the components in reader system 600 may be implemented as integrated circuits using CMOS technology, BJT technology, MESFET technology, and/or any other suitable physical implementation technology. Components may also be implemented as software executing on general-purpose or application-specific hardware.

In one embodiment, a "reader" as used in this disclosure may include at least one reader module like reader module 602 and at least one local controller such as local controller 612. Such a reader may or may not include any remote controllers such as remote controller 622. A reader including a reader module and a local controller may be implemented as a standalone device or as a component in another device. In some embodiments, a reader may be implemented as a mobile device, such as a handheld reader, or as a component in a mobile device such as a laptop, tablet, smartphone, wearable device, or any other suitable mobile device.

Remote controller 622, if not included in a reader, may be implemented separately. For example, remote controller 622 may be implemented as a local host, a remote server, or a database, coupled to one or more readers via one or more communications networks. In some embodiments, remote controller 622 may be implemented as an application executing on a cloud or at a datacenter.

Functionality within reader system 600 may be distributed in any suitable way. For example, the encoding and/or decoding functionalities of blocks 604 and 606 may be performed by processor blocks 614 and/or 624. In some embodiments, processor blocks 614 and 624 may cooperate to execute an application or perform some functionality. One of local controller 612 and remote controller 622 may not implement memory, with the other controller providing memory.

Reader system 600 may communicate with at least one service 632. Service 632 provides one or more features, functions, and/or capabilities associated with one or more entities, such as reader systems, tags, tagged items, and similar. Such features, functions, and/or capabilities may include the provision of information associated with the entity, such as warranty information, repair/replacement information, upgrade/update information, and similar; and the provision of services associated with the entity, such as storage and/or access of entity-related data, location tracking for the entity, entity security services (e.g., authentication of the entity), entity privacy services (e.g., who is allowed access to what information about the entity), and similar. Service 632 may be separate from reader system 600, and the two may communicate via one or more networks.

In some embodiments, an RFID reader or reader system implements the functions and features described above at least partly in the form of firmware, software, or a combination, such as hardware or device drivers, an operating system, applications, and the like. In some embodiments, interfaces to the various firmware and/or software components may be provided. Such interfaces may include application programming interfaces (APIs), libraries, user interfaces (graphical and otherwise), or any other suitable interface. The firmware, software, and/or interfaces may be implemented via one or more processor blocks, such as processor blocks 614/624. In some embodiments, at least some of the reader or reader system functions and features can be provided as a service, for example, via service 632 or service 640.

Figure 7:
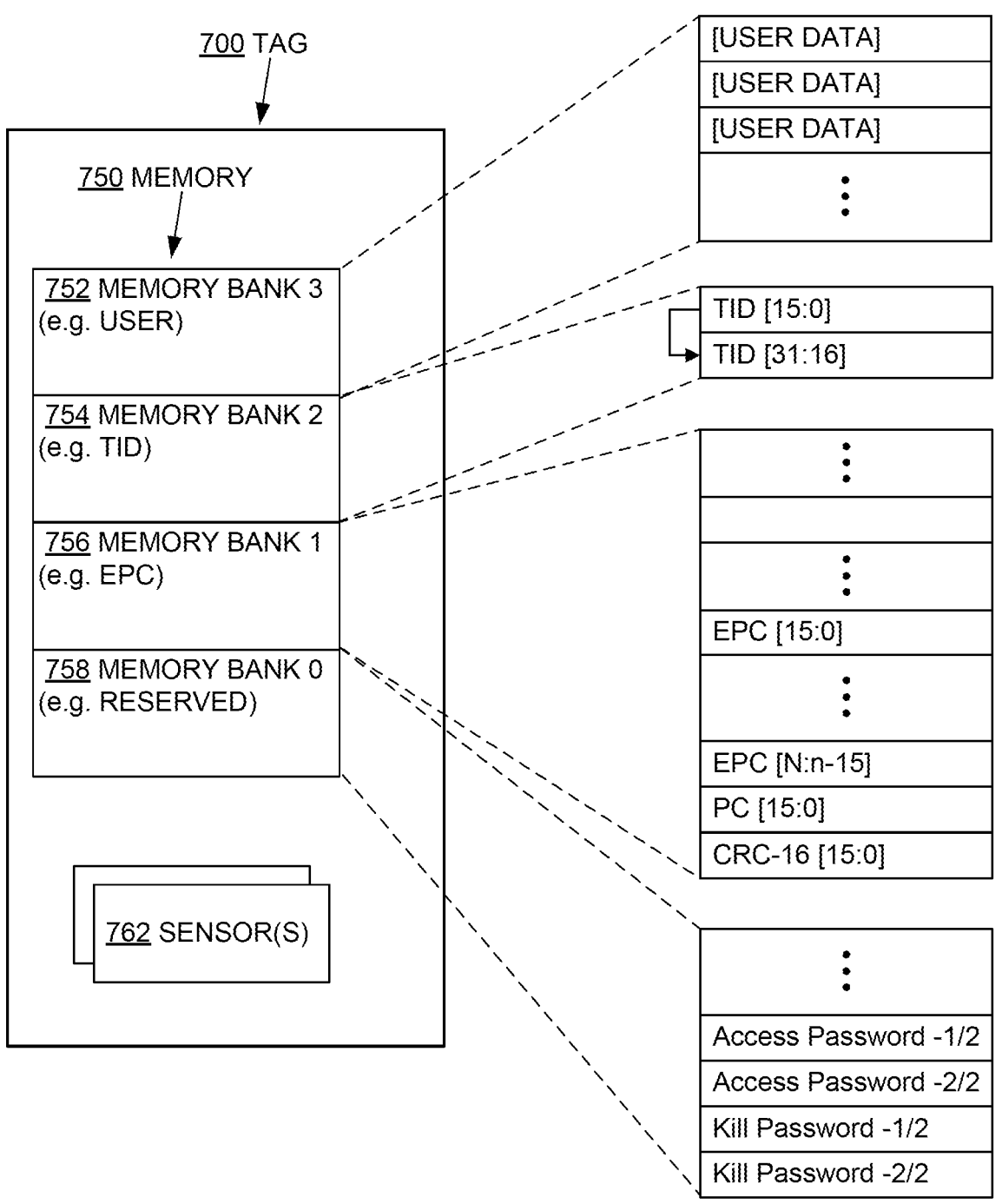
FIG. 7 is a diagram of an example RFID tag IC memory configuration, according to embodiments.

FIG. 7 is a diagram of an example RFID tag IC memory configuration, according to embodiments.

Diagram 700 shows an example RFID tag IC memory configuration, according to embodiments. Diagram 700 depicts an RFID tag IC memory 750, resembling the physical memory configuration described in the Gen2 Protocol. Memory 750 includes four partitions or sections 752, 754, 756, and 758. Partition 752 ("user memory") may be configured to store user data. Partition 754 ("TID memory") may be configured to store an identifier for the tag IC itself, such as a tag identifier or TID. Partition 756 ("EPC memory") may be configured to store an identifier for an item associated with or attached to the tag IC, such as an electronic product code or EPC. Partition 758 ("Reserved memory") may be configured to store information reserved for the tag IC itself or otherwise not necessarily publicly accessible, such as passwords, PINs, cryptographic keys, or similar. The Gen2 Protocol specifies that two passwords, the Access password and the Kill password, can be stored in partition 758. The Access password, if present, can be used to restrict certain tag IC operations as described in the Gen2 Protocol. The Kill password, if present, can be used to cause a tag IC to enter the Killed state as described in the Gen2 Protocol. As these passwords are sensitive, partition 758 is generally not publicly accessible.

In some example implementations, data associated with the modified inventorying commands such as memory configuration bits (e.g., the T bit), data to be compared to an inventorying command mask value, and portions or the entirety of a tag identifier (TID) and/or an item identifier (II) (e.g., EPC or UII), may be stored in one or more specific memory banks. For example, the memory configuration bit(s) may be stored in bank 1 (e.g., the Gen2 Protocol specifies that the T bit is bit 17h of bank 1, which is EPC memory).

The configuration of tag IC memory 750 is provided as an example. Tag IC memory can have any number of partitions configured to store any suitable information.

FIGS. 8A and 8B illustrate command structures of Query and Select commands according to the Gen2 Protocol.

According to the Gen2 Protocol, a Query command 810 may initiate an inventory round in a new session or in the prior session. As discussed herein, tags may be in various states such as open, acknowledged, secured, etc. and in various sessions. If a tag in the acknowledged, open, or secured states receives a Query command whose session parameter matches the prior session it may invert its inventoried flag for the session before it evaluates whether to transition to ready, arbitrate, or reply. If a tag in the acknowledged, open, or secured states receives a Query whose session parameter does not match the prior session it may leave its inventoried flag for the prior session unchanged when beginning the new round. Query command may include a number of fields starting with command identifier, followed by, DR (TRcal divide ratio) which sets the T=>R link frequency, M (cycles per symbol) which sets the T=>R data rate and modulation format, Text which chooses whether a tag prepends the T=>R preamble with a pilot tone, Sel which chooses which tags respond to the Query (based on previously sent Select command), Session which chooses a session for the inventory round, Target which selects whether tags whose inventoried flag is A or B participate in the inventory round as a result of being singulated, Q which sets the number of slots in the round (based on section 6.3.2.10 in the Gen2 Protocol), and CRC (cyclical redundancy check).

According to the Gen2 Protocol, a Select command 820 allows a reader to select a tag subpopulation based on user-defined criteria, enabling union (U), intersection (∩), and negation (~) based tag partitioning. Readers perform U and ∩ operations by issuing successive Select commands. A Select command 820 can assert or deassert a tag's SL flag, which applies across all four sessions, or it can set a tag's inventoried flag to either A or B in any one of the four sessions. A tag executes a Select from any state except killed.

According to the Gen2 Protocol, the Select command 820 may include the following parameters: Target indicates whether the Select command modifies a tag's SL flag or its inventoried flag, and if modifying the inventoried flag, it further specifies one of four sessions. Action elicits the tag behavior in which matching and not-matching tags assert or deassert SL or set their inventoried flag to A or B. A tag conforming to the contents of the MemBank, Pointer, Length, and Mask fields is matching. The criteria for determining whether a tag is matching or not-matching are specified by the MemBank, Pointer, Length and Mask fields. MemBank specifies how a tag applies Mask as described in the Gen2 Protocol. Pointer specifies a starting bit address for the Mask comparison. Length specifies the length of Mask. Mask may be a bit string that a tag compares to a memory location that begins at Pointer and ends Length bits later. Truncate indicates whether a tag's backscattered reply shall be truncated to those EPC bits that follow Mask. CRC is the cyclical redundancy check for error detection.

Figure 9A:
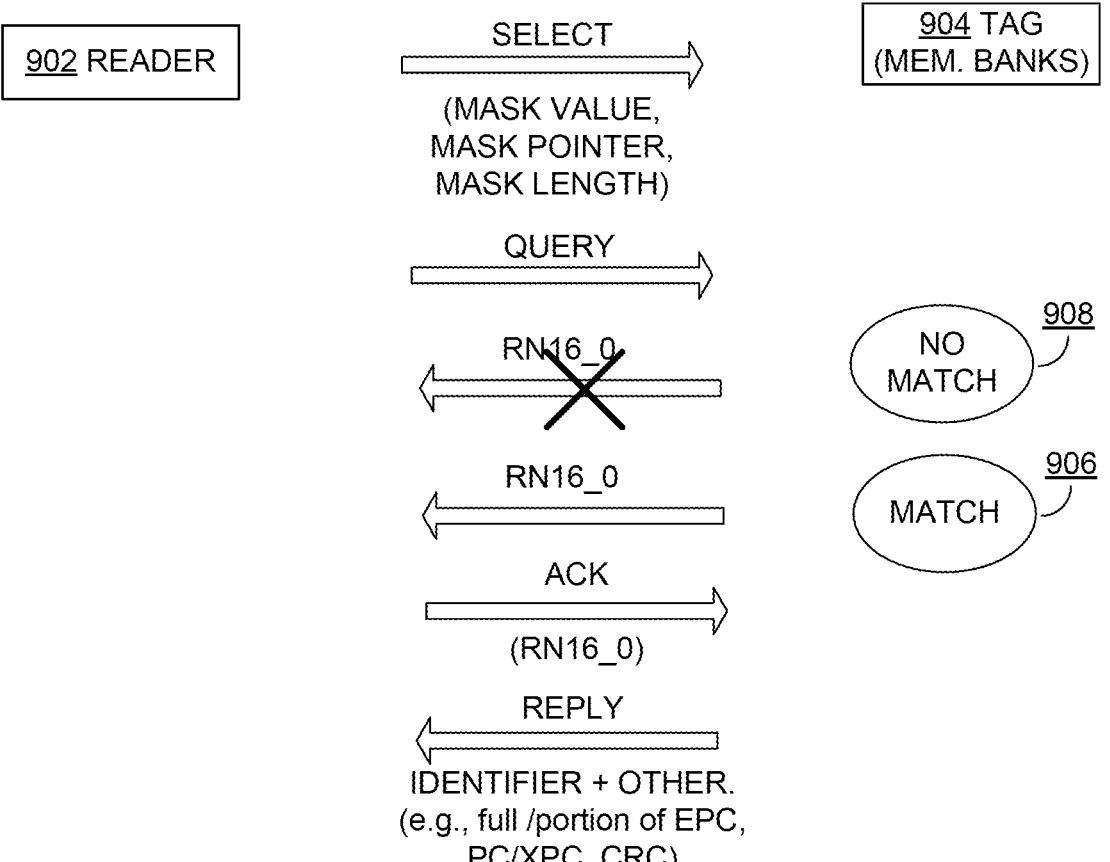
FIG. 9A through 9C illustrate exchanges between a reader and a tag using standard and modified inventorying commands according to embodiments.
Figure 9B:
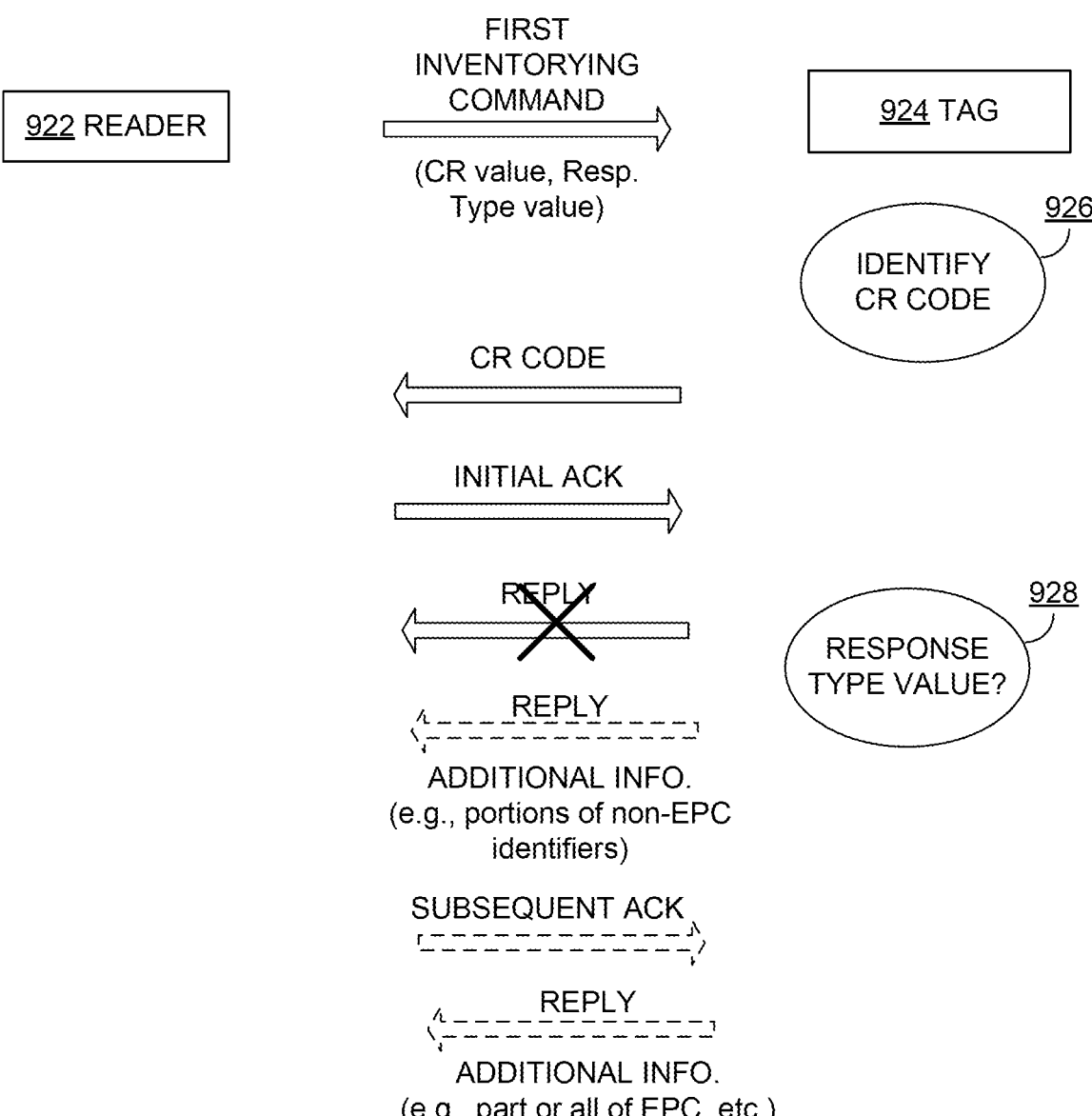
Figure 9C:
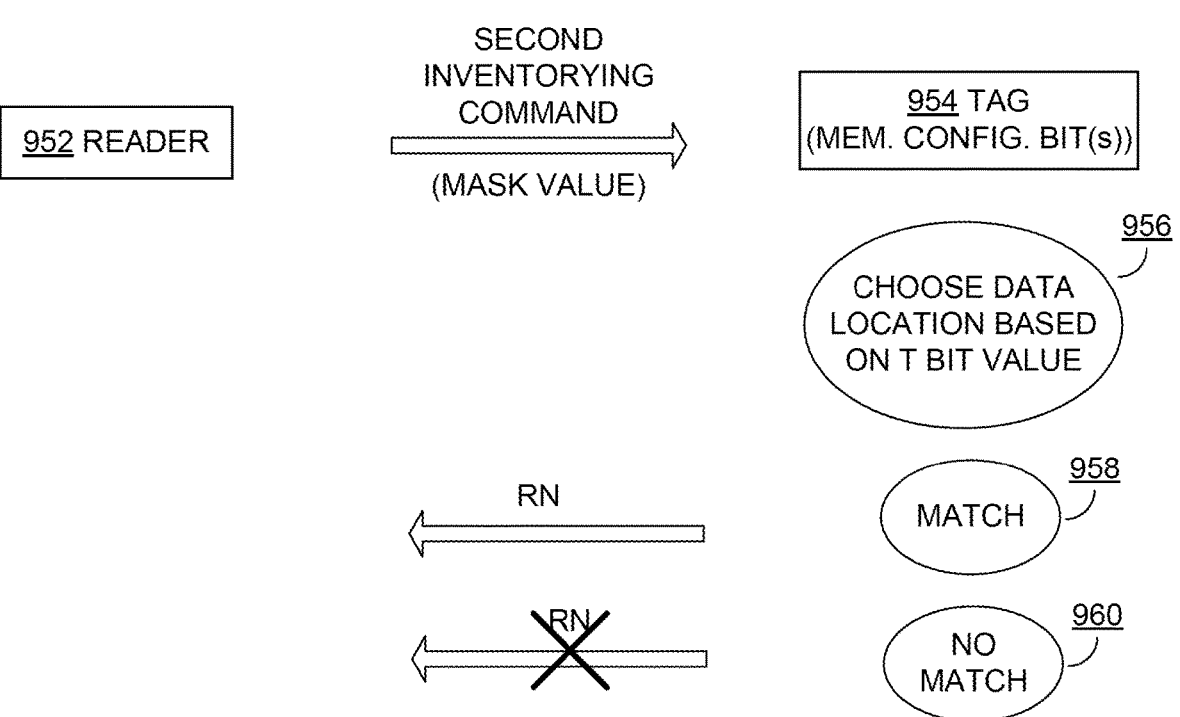

FIGS. 9A through 9C illustrate exchanges between a reader and a tag using standard and modified inventorying commands according to embodiments.

As shown in diagram 900, exchanges according to the Gen2 Protocol may begin with a tag subpopulation selection, in which the reader 902 selects one or more tags (including tag 904) from among a tag population for subsequent inventorying. For example, the reader 902 may transmit a Gen2 Select command specifying that tags having certain attributes set their SL flag to a certain value. Among other parameters, the Select command may include a mask value, a mask pointer, and a mask length, allowing the tag to compare the mask value to data starting at a location identified by the mask pointer with the length of the data for comparison being defined by the mask length. In response, tags that receive the Select command, have those certain attributes, and have data that correspond to the specified mask value, mask pointer, and mask length will match (906) and adjust their SL flags appropriately. Tags that receive the Select command but do not have those certain attributes or data that correspond to the specified mask value/pointer/ length will not match (908) and therefore will not adjust their SL flags according to the Select command.

During an inventory following the selection, reader 902 transmits a Query command as described in the Gen2 Protocol to initiate an inventory round for tags that matched the previous Select command. If tag 904 had matched (906), it participates in the inventory round by replying to the Query command as prescribed by the Gen2 Protocol. If tag 904, on the other hand, did not match (908), then it does not participate in the inventory round and does not reply to the Query command.

In the inventory round, any participating tag with a current slot counter value of 0 will reply with a 16-bit pseudorandom number. In this example, assume that tag 904 matches (906) and therefore is participating in the inventory round, has a slot counter value of 0), and no other participating tag has a slot counter value of 0. Accordingly, tag 904 and only tag 904 will reply to the Query command with a pseudorandom number, denoted "RN16_0". Reader 902 then acknowledges tag 904 by sending a Gen2 ACK command including the RN16_0. Tag 904, upon receiving the ACK command and corroborating that the included RN16_0 matches the pseudorandom number it sent, then replies with an identifier and other supporting information. The Gen2 Protocol specifies that the identifier in the tag reply will be either a portion of or the entire EPC of the tag, and that the other supporting information may include protocol-control information (e.g., PC/XPC bits and CRC bits).

Diagram 920 in FIG. 9B shows exchanges between reader 922 and tag 924 according to a first inventorying command in a modified inventory process, where the first inventorying command may combine some of the functionality of the Gen2 Select and Query commands allowing for a faster inventory process. The first inventorying command may include some or all of the fields (parameters) specified in the Select and Query commands according to the Gen2 Protocol, as well as other fields for additional functionality. For example, a collision resolution (CR) field may allow tag 924 to reply with not just an RN16, but other information including, but not limited to, 32 trailing UII bits, 16 trailing UII bits, or a stored CRC. Another field in the first inventorying command may be a response-type value field, which may specify, for example, whether in response to an acknowledgment command the tag is to (a) refrain from replying or (b) optionally reply with an acknowledgment code. The acknowledgment code may include, but is not limited to, a tag identifier (TID) portion, an item identifier portion different from the one in the CR code, or the entire item identifier as specified by the response-type parameter value.

More generally, an inventorying command according to a modified inventory process may allow a suitably configured tag to respond with collision-resolution information instead of (or in addition to) a 16-bit pseudorandom number. The other information can be of any suitable length, and could include a longer pseudorandom number, part or all of one or more tag identifiers (e.g., the TID and/or the EPC), information associated with one or more tag identifiers (e.g., error-checking and/or protocol-control information associated with the TID and/or the EPC), a cryptographic value (e.g., a value computed using a tag key from a known value such as a tag identifier or associated information) or any other suitable information associated with and/or stored on the tag. The other information may be chosen to provide some collision-resolving capability, such that it is relatively unlikely two different tags in the same population have the same "other information" value. For example, if identifiers in a tag population tend to have more diverse least-significant-bits (LSBs) than most-significant-bits (MSBs), then identifier LSBs may be chosen as the "other information". This reduces the likelihood that multiple tags will share the same "other information", thereby reducing the probability of tag collisions.

As another example, a tag may be configured such that it responds to an initial, correct ACK command (that is, an ACK command that includes data matching data previously sent by the tag) with other information instead of or in addition to a portion of or its entire EPC. In one alternative response option, the tag may not respond at all to an initial correct ACK command. This could speed up the inventorying process, because if the tag had been previously inventoried by the reader, the reader presumably already knows the tag identifier and doesn't need to receive it again. In another alternative response option, the tag may respond to the initial correct ACK command with part or all of one or more other, non-EPC identifiers (e.g., its TID or UII). By providing part (or all) of the non-EPC identifiers at this point in the inventorying process, the reader may not have to later request the provided identifier portions later, thereby speeding up the inventorying process. In yet another alternative response option, the tag may respond to the initial correct ACK command with at least a portion of its EPC or identifier(s) that it has not yet provided. For example, suppose that the tag previously responded to the first inventorying command with a first portion of its EPC. The tag may then respond to the initial ACK command with a second portion of its EPC different from the first portion. If the tag previously responded with its entire EPC, then the tag may respond to the initial ACK command with other information associated with the EPC (e.g., PC/XPC/CRC bits). When responding to the initial correct ACK command, the tag may further adjust identifier-associated information based on its response. For example, the tag may adjust length bits in PC/XPC bits based on the length of the identifier portion included in the response.

In other examples, the tag may respond to the initial correct ACK command with other information, which may or may not be associated with or derived from one or more tag identifiers. For example, the tag may respond to the initial correct ACK command with all or part of a cryptographic value. The tag may compute the cryptographic value based on a tag key, a previously received cryptographic challenge, a random or pseudorandom number, one or more tag identifiers or tag identifier portions, and/or any other suitable information known to/stored on the tag.

In all of the ACK alternative response options above, the tag may be configured to respond to a second correct ACK command after the initial correct ACK command with part or all of its EPC and associated information (e.g., PC/XPC/CRC bits), similar to the ACK response behavior described in the Gen2 Protocol. This may be useful if the reader (or a coupled controller) determines that it actually requires more information from the tag than it already has received, or if it needs to check the correctness of previously received information. The second ACK command may be sent (or received) immediately after the initial ACK command, where "immediately" means that the reader does not transmit any other commands between the two ACK commands. In some examples, the reader may transmit other commands between the initial and second ACK commands, yet the tag may still respond to the second ACK command with part or all of its EPC and associated information.

Thus, in the example exchange of diagram 920, tag 924 may identify the CR code (926) and send the CR code to reader 922 in response to the first inventorying command, then receive a first acknowledgment command. Tag 924 may respond to the first acknowledgment command with additional information or refrain from responding based on the response-type value (928). In some examples, reader 922 may send a second acknowledgment command following the first one to tag 924. Tag 924 may reply by sending the entire II regardless of the response-type value depending on its configuration.

As described above, tags may be configured to send additional or alternative responses to a first inventorying command and/or ACK commands other than specified by the Gen2 Protocol or ISO/IEC 18000-63 for standard Query and/or Select commands. Readers may be configured to cause appropriately configured tags to respond with these alternative responses in any suitable way. For example, a reader may transmit a command including one or more fields that specify if a receiving tag should send alternative responses, and if so the specific alternative response. A first inventorying command, as discussed above, may share some common fields (parameters) with Gen 2 commands such as Select, Query, Query Adj, and/or Query Rep, and be used to elicit alternative responses from suitably configured tags.

Diagram 950 in FIG. 9C shows exchanges between reader 952 and tag 954 according to a second inventorying command in a modified inventory process. The second inventorying command may also combine some of the functionality of Select and Query commands to increase inventorying efficiency. The second inventorying command may include some or all of the fields (parameters) specified in the Select and Query commands according to Gen2 Protocol, as well as other fields for additional functionality.

In an example operation, tag 954, upon receiving the second inventorying command specifying a mask value, may use one or more memory configuration bits to determine a memory location of already-stored data to be compared to the mask value. Thus, reader 952 does not have to and indeed does not provide, in the second inventorying command or otherwise, any memory locations telling tag 954 where to look for data for comparing to the mask value. In fact, reader 952 may not even know where tag 954 or indeed any tag stores the relevant data, which may be particularly useful when tags with different numbering schemes, formats, and memory structures are present. In some embodiments, the second inventorying command may include a mask length field specifying predefined lengths for the mask length, for example, 8, 16, or 24 bits.

Upon receiving the second inventorying command, tag 952 may retrieve the data from a memory location indicated by the memory configuration bit(s) and determine whether the retrieved data matches the mask value specified by the second inventorying command. If the retrieved data matches (958), then tag 952 participates in the inventory round initiated by the second inventorying command. If the retrieved data does not match (960), then tag 952 does not participate in the inventory round.

The memory configuration bit(s) may be one or more bits in a memory of tag 954. The value(s) of the memory configuration bit(s) may be programmed at tag or tag IC manufacturing, and may either be unchangeable afterward (e.g., written into ROM) or reprogrammable in the field. In one implementation, the memory configuration bit may be a T bit according to the Gen2 Protocol, which notes that the T bit, implemented at bit 17h of memory bank 1/EPC memory bank, may also be used as a "numbering system identifier toggle". In one embodiment, tag 954 uses the memory configuration bit(s) to determine a memory location at which to start retrieving data for comparison to the mask value. If the second inventorying command includes a mask length parameter, then tag 954 may retrieve data starting at the memory location and extending for a length equivalent to the mask length parameter. If the second inventorying command does not include a mask length parameter, then tag 954 may determine the length of the data to be retrieved based on the memory configuration bit(s) and/or via any other suitable means. In one specific implementation, one value of the T bit causes tag 954 to retrieve data starting at bit 20h of bank 1/EPC memory, and another value of the T bit causes tag 954 to retrieve data starting at bit 18h of bank 1/EPC memory.

In one embodiment, the data chosen by the tag for comparison to the mask value may be divided into data portions located in two or more non-contiguous memory locations or even in different memory banks. In this example, the tag may (a) retrieve the data, concatenate the data portions to form a combination, and compare the combination to the mask value, or (b) divide the mask value into portions corresponding to the stored data, then compare the divided mask value portions to the stored data portions. For (b), the tag may determine that the stored data matches the mask value if each of the divided mask value portions match a corresponding stored data portion.

While in the above description the tag determines whether stored data matches the mask value, in some embodiments the tag determines whether the mask value corresponds to the stored data as opposed to matching it. For example, the tag may perform a computation to derive a first value from the stored data and/or a second value from the mask value, and either compare the first value to the mask value or the second value or compare the stored data to the second value. As another example, the tag may determine whether the mask value corresponds to some other value known to the tag, in addition to or instead of stored data. This other value could be derived from tag features or capabilities.

Figure 10:
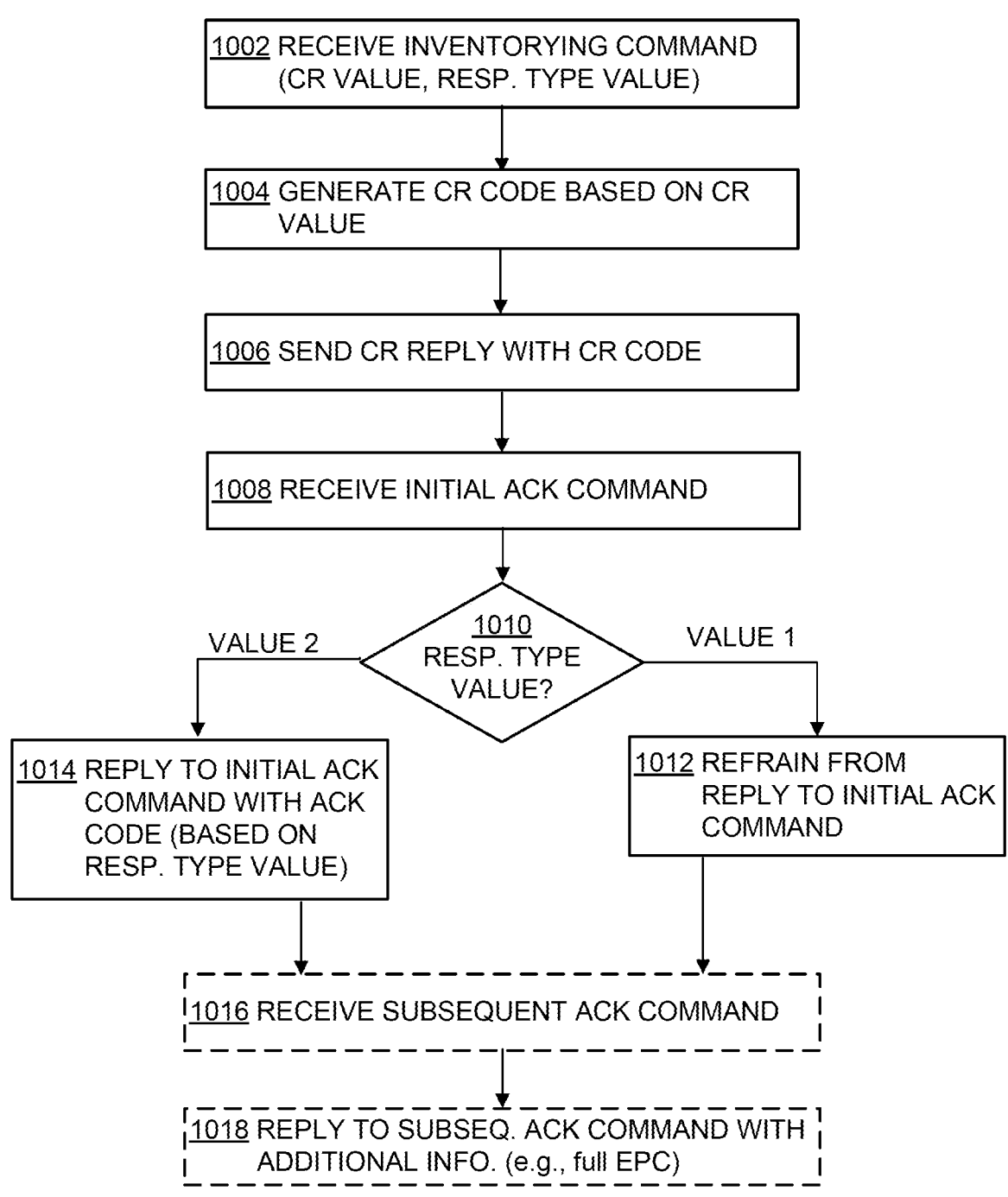
FIGS. 10 and 11 illustrate flow diagrams of two methods to use modified inventorying commands according to embodiments.
Figure 11:
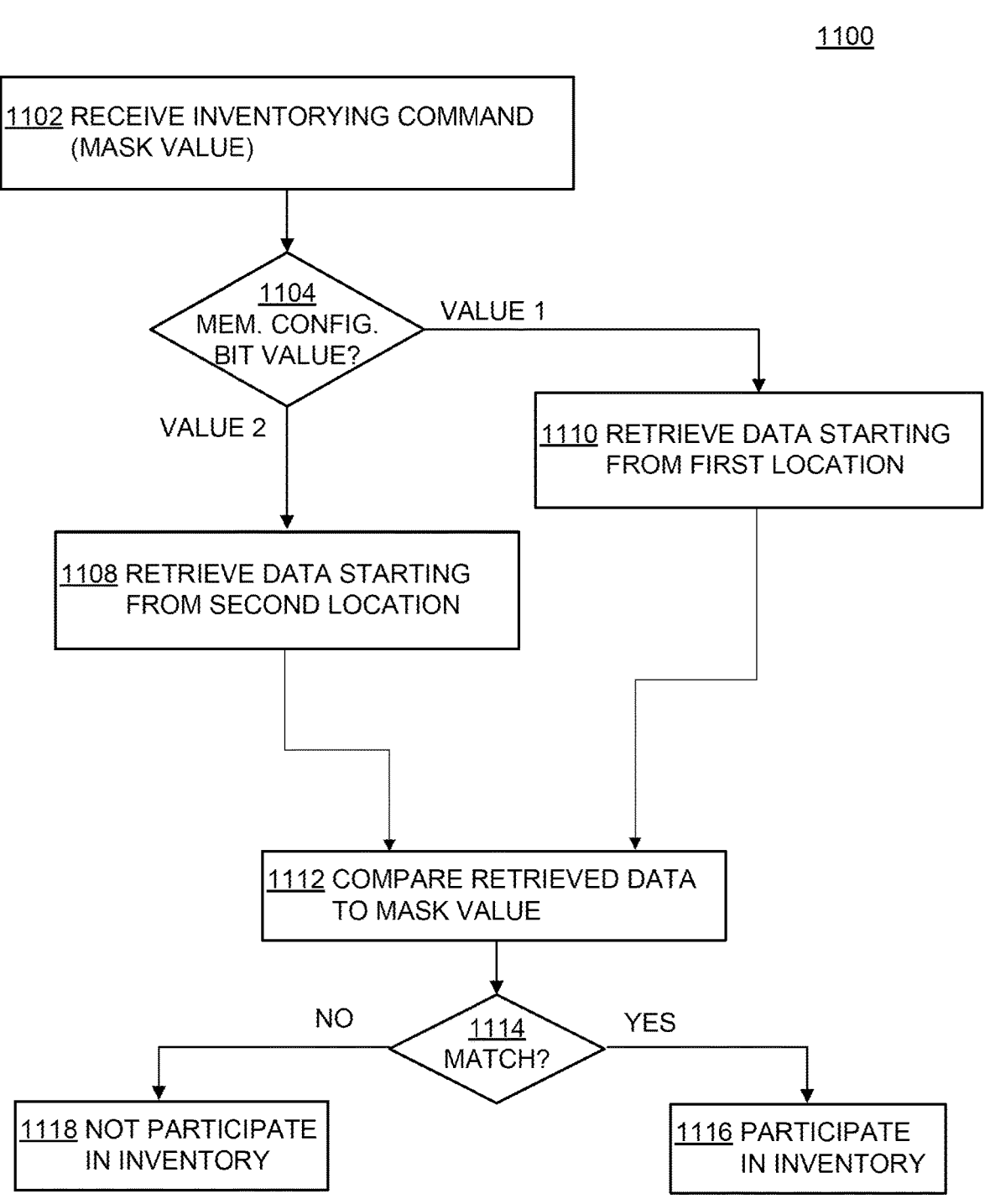

FIGS. 10 and 11 illustrate flow diagrams of two methods to use modified inventorying commands according to embodiments.

Process 1000 in FIG. 10 begins with step 1002, where a tag configured according to a modified inventorying process receives the first inventorying command, which includes, among other parameters, a collision resolution (CR) value and a response-type value. The CR value may indicate to the tag how to generate a CR code. For example, the tag may select a trailing II (e.g., EPC) portion, a stored cyclic-redundancy-check code, or a pseudorandom number. The trailing portion of the II may be 16 or 32 bits. The pseudo-random number may be a 16-bit random number in some implementations. The response-type value may indicate to the tag which additional information to send (if any) when responding to an initial acknowledgment command from the reader. Examples may include, but are not limited to, a portion of a TID, a portion of II different from the one used in the CR code, or the entire II.

At step 1004, the tag generates the CR code based on the CR value in the first inventorying command, and at step 1006 the tag sends a CR reply to the reader including the generated CR code. Subsequently, the tag may receive an initial acknowledgment command in step 1008. Next, the tag may determine which information to include in the response to the initial acknowledgment command at step 1010. If the response-type value parameter has one value, the tag may refrain from responding to the initial acknowledgment command (1012). If the response-value has another value, the tag may respond with an acknowledgment code that is selected by the tag based on the response-type value at step 1014. In some examples, the response-type value may be a single bit parameter allowing the tag to refrain from responding or respond with one type of information only. In other examples, the response-type value may be a two-bit parameter, where refraining from responding is one of the four possible values, and the other three values indicate the information to be included in the acknowledgment code (e.g., the examples above). Of course, the response-type value may also have a larger size (3-bit, 4-bit, etc.) in other examples.

The tag may receive at optional step 1016 a subsequent ACK command and be configured to respond to the subsequent ACK command with part or all of its EPC and associated information (e.g., PC/XPC/CRC bits) at optional step 1018, similar to the ACK response behavior described in the Gen2 Protocol. The subsequent ACK command may be sent (or received) immediately after the initial ACK command, where "immediately" means that the reader does not transmit any other commands between the two ACK commands. In some examples, the reader may transmit other commands between the initial and subsequent ACK commands, yet the tag may still respond to the subsequent ACK command with part or all of its EPC and associated information.

Process 1100 in FIG. 11 begins with step 1102, where a tag configured according to a modified inventorying process receives the second inventorying command, which includes, among other parameters, a mask value. Upon identifying the received command as the second inventorying command (e.g., by the command identifier), the tag determines the value of its memory configuration bit(s) at step 1104, as described above.

Based on the value of its memory configuration bit(s), the tag may determine a memory location from which data is to be retrieved for comparison to the mask value. If the memory configuration bit(s) have a first value, the tag may retrieve data from a first memory location (1110). If the memory configuration bit(s) have a second value, the tag may retrieve data from a second memory location (1108). In some embodiments, the memory configuration bit(s) are implemented by a T bit as described in the Gen2 Protocol/ISO/IEC 18000-63 and may indicate a starting memory location from which data is to be retrieved, as described above. In other embodiments, the memory configuration bit(s) may include more than one bit, allowing data stored in third, fourth, or even more different memory locations to be used for comparison to the mask value. The value(s) of the memory configuration bit(s) may be programmed at manufacturing and may subsequently be unchangeable or reprogrammable in the field. In all of these cases, the reader does not know the memory location(s) from which the tag is retrieving data for comparison.

Once the tag has retrieved the data whose location is indicated by its memory configuration bit(s), it may compare the data to the mask value included in the second inventorying command at step 1112. If a match is determined at step 1114, the tag may participate in the inventory round at step 1116. If there is no match, the tag may refrain from participating in the inventory round at step 1118. In some alternative examples, the length of the mask value may also be included in the second inventorying command and used by the tag to determine the length of the data to be retrieved for comparison.

While processes 1000 and 1100 describe two different versions of inventorying commands, in some embodiments the two versions can be combined into a unified inventorying command. The unified inventorying command includes a CR value, a response-type value, and a mask value. When the unified inventorying command is used to initiate an inventory round, only tags with stored data that correspond to the mask value participate, as described in process 1100. During participation, the tags will respond with CR codes and acknowledgment codes as described in process 1000.

The steps described in processes 1000 and 1100 of FIG. 10 and FIG. 11 are for illustrative purposes only. These steps may be implemented using additional or fewer steps and in different orders using the principles described herein.

According to some examples, a method for an RFID integrated circuit coupled to an antenna to respond in an inventory round is described. The method includes receiving an inventorying command initiating an inventory round, wherein the inventorying command includes a collision resolution (CR) value and a response-type value; generating a CR reply based on the CR value by: identifying, based on the CR value, a CR code, wherein the CR code is one of a trailing item identifier (II) portion, a stored cyclic-redundancy-check code, and a pseudorandom number, and including the CR code in the CR reply; sending the CR reply; receiving a first acknowledgement command in response to sending the CR reply; and if the response-type value indicates that no acknowledgement reply is to be sent, then refraining from replying to the first acknowledgement command, otherwise replying by sending an acknowledgement code indicated by the response-type value, wherein the acknowledgement code is one of a tag identifier (TID) portion, another II portion, and the entire II.

According to other examples, another method for an RFID integrated circuit coupled to an antenna to respond in an inventory round is described. The method includes receiving an inventorying command initiating an inventory round, wherein the inventorying command includes a collision resolution (CR) value and a response-type value; generating a CR reply based on the CR value by: identifying, based on the CR value, a CR code, wherein the CR code is one of an item identifier (II) portion, a stored cyclic-redundancy-check code, and a pseudorandom number, and including the CR code in the CR reply; sending the CR reply; receiving a first acknowledgement command in response to sending the CR reply; and if the response-type value indicates that no acknowledgement reply is to be sent, then refraining from replying to the first acknowledgement command, otherwise replying by sending an acknowledgement code indicated by the response-type value, wherein the acknowledgement code is one of a tag identifier (TID) portion, the entire TID, another II portion, and the entire II.

According to further examples, the above methods further include upon receiving a second acknowledgement command, replying to the second acknowledgement command by sending the entire II regardless of the response-type value. The methods also include receiving the second acknowledgement command upon replying to the first acknowledgement command or upon refraining from replying to the first acknowledgement command. The above methods further include receiving the second acknowledgement command upon refraining from replying to the first acknowledgement command; and sending a cryptographic value computed based on a tag key in response to the second acknowledgement command. The other II portion is the entire II excluding the trailing II portion. The pseudorandom number is generated by the RFID IC upon receiving the first acknowledgement command.

According to yet other examples, a Radio Frequency Identification (RFID) integrated circuit configured to be coupled to an antenna is described. The IC includes a memory configured to store data; a transceiver configured to receive commands and send replies; and a processing block coupled to the memory and transceiver, wherein the processing block is configured to perform the above-described actions.

According to some examples, a method for a Radio Frequency Identification (RFID) integrated circuit configured to be coupled to an antenna is described, the IC having an IC memory partitioned into one or more memory banks. The method includes receiving, from an RFID reader, an inventorying command initiating an inventory round and specifying a mask value; determining a value of a T bit stored in a memory of the RFID IC, wherein the T bit is implemented according to one of the Gen2 Protocol and the ISO/IEC-18000-63 standard; determining, based on the T bit value, a starting memory location in a first memory bank; choosing data with the determined starting memory location; determining whether the mask value matches the chosen data; and if the mask value matches the chosen data, then participating in the inventory round, otherwise refraining from participating in the inventory round.

According to other examples, another method for a Radio Frequency Identification (RFID) integrated circuit configured to be coupled to an antenna is described, the IC having an IC memory partitioned into one or more memory banks. The method includes receiving, from an RFID reader, an inventorying command initiating an inventory round and specifying a mask value; determining a value of a T bit stored in a memory of the RFID IC, wherein the T bit is implemented according to one of the Gen2 Protocol and the ISO/IEC-18000-63 standard; determining, based on the T bit value, a starting memory location in a first memory bank; choosing data with the determined starting memory location; determining whether the mask value corresponds to the chosen data; and if the mask value corresponds to the chosen data, then participating in the inventory round, otherwise refraining from participating in the inventory round.

According to further examples, a length of the mask value is specified in the inventorying command and unknown to the RFID IC, the length of the mask value is determined by the RFID reader, and/or the starting memory location is unknown to the RFID reader. The starting memory location is unknown to the RFID reader and the inventorying command does not specify the starting memory location. Determining the starting memory location includes determining a first memory location if the T bit has a first value; and determining a second memory location if the T bit has a second value. The first memory location is bit 20h in the first memory bank and the second memory location is bit 18h in the first memory bank. The chosen data includes a plurality of data portions, each data portion stored in a different memory location, and the methods further include concatenating the plurality of data portions; or dividing the mask value into a plurality of mask portions. The data portions are stored in a plurality of noncontiguous memory locations in a same memory bank; or a plurality of memory banks.

According to yet other examples, the starting memory location is preset in the RFID IC prior to receiving the inventorying command and non-reconfigurable. Alternatively, the starting memory location is reconfigurable. The first memory bank is one of an EPC memory bank, a TID memory, a User memory bank, and a Reserved memory bank, all according to the Gen2 Protocol, or UII memory according to the ISO/IEC-18000-63 standard. Determining whether the mask value corresponds to the chosen data includes computing a derived value from the mask value; and comparing the derived value to the chosen data. Determining whether the mask value corresponds to the chosen data includes computing a derived value from the chosen data; and comparing the derived value to the mask value. The above methods further include if the mask value matches or corresponds to the chosen data, performing a preset function or activating a preset feature.

According to yet further examples, a Radio Frequency Identification (RFID) integrated circuit configured to be coupled to an antenna is described. The IC includes a memory configured to store data; a transceiver configured to receive commands and send replies; and a processing block coupled to the memory and transceiver, wherein the processing block is configured to perform the above-described actions.

As mentioned previously, embodiments are directed to modifying RFID tag inventorying. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. Information represented by the states of these quantities may be referred-to as bits, data bits, samples, values, symbols, characters, terms, numbers, or the like. However, these and similar terms are associated with and merely convenient labels applied to the appropriate physical quantities, individually or in groups.

Embodiments furthermore include storage media. Such media, individually or in combination with others, have stored thereon instructions, data, keys, signatures, and other data of a program made according to the embodiments. A storage medium according to embodiments is a computer-readable medium, such as a memory, and can be read by a processor of the type mentioned above. If a memory, it can be implemented in any of the ways and using any of the technologies described above.

Even though it is said that a program may be stored in a computer-readable medium, it does not need to be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

The foregoing detailed description has set forth various embodiments of the devices and/or processes via the use of block diagrams and/or examples. Insofar as such block diagrams and/or examples contain one or more functions and/or aspects, each function and/or aspect within such block diagrams or examples may be implemented individually and/or collectively, by a wide range of hardware, software, firmware, or virtually any combination thereof. Some aspects of the embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, tags, RFICs, readers, systems, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method for an RFID integrated circuit coupled to an antenna to respond in an inventory round, the method comprising:

receiving an inventorying command initiating an inventory round, wherein the inventorying command includes a collision resolution (CR) value and a response-type value;

generating a CR reply based on the CR value by:

identifying, based on the CR value, a CR code, wherein the CR code is one of a trailing item identifier (II) portion, a stored cyclic-redundancy-check code, and a pseudorandom number; and including the CR code in the CR reply;

sending the CR reply;

receiving a first acknowledgment command in response to sending the CR reply; and if the response-type value indicates that no acknowledgment reply is to be sent, then refraining from replying to the first acknowledgment command, otherwise replying by sending an acknowledgment code indicated by the response-type value, wherein the acknowledgment code is one of a tag identifier (TID) portion, another II portion, and the entire II.

2. The method according to claim 1, further comprising:

upon receiving a second acknowledgment command, replying to the second acknowledgment command by sending the entire II regardless of the response-type value.

3. The method according to claim 2, further comprising:

receiving the second acknowledgment command upon replying to the first acknowledgment command or upon refraining from replying to the first acknowledgment command.

4. The method according to claim 3, further comprising:

receiving the second acknowledgment command upon refraining from replying to the first acknowledgment command; and sending a cryptographic value computed based on a tag key in response to the second acknowledgment command.

5. The method according to claim 1, wherein the other II portion is the entire II excluding the trailing II portion.

6. The method according to claim 1, wherein the pseudorandom number is generated by the RFID IC upon receiving the first acknowledgment command.

7. A Radio Frequency Identification (RFID) integrated circuit (IC) configured to be coupled to an antenna, the IC comprising:

a memory configured to store data;

a transceiver configured to receive commands and send replies; and a processing block coupled to the memory and transceiver, wherein the processing block is configured to:

receive an inventorying command initiating an inventory round, wherein the inventorying command includes a collision resolution (CR) value and a response-type value;

generate a CR reply based on the CR value by:

identifying, based on the CR value, a CR code, wherein the CR code is one of a trailing item identifier (II) portion, a stored cyclic-redundancy-check code, and a pseudorandom number; and including the CR code in the CR reply;

send the CR reply;

receive a first acknowledgment command in response to sending the CR reply; and if the response-type value indicates that no acknowledgment reply is to be sent, then refrain from replying to the first acknowledgment command, otherwise reply by sending an acknowledgment code indicated by the response-type value, wherein the acknowledgment code is one of a tag identifier (TID) portion, another II portion, and the entire II.

8. The RFID IC according to claim 7, wherein the processing block is further configured to:

upon receiving a second acknowledgment command, reply to the second acknowledgment command by sending the entire II regardless of the response-type value.

9. The RFID IC according to claim 7, wherein the processing block is further configured to:

receive the second acknowledgment command upon replying to the first acknowledgment command or upon refraining from replying to the first acknowledgment command.

10. The RFID IC according to claim 9, wherein the processing block is further configured to:

receive the second acknowledgment command upon refraining from replying to the first acknowledgment command; and send a cryptographic value computed based on a tag key in response to the second acknowledgment command.

11. The RFID IC according to claim 7, wherein the other II portion is the entire II excluding the trailing II portion.

12. The RFID IC according to claim 7, wherein the pseudorandom number is generated by the RFID IC upon receiving the first acknowledgment command.

* * * * *